United States Patent
Chae

(10) Patent No.: US 6,919,931 B2
(45) Date of Patent: Jul. 19, 2005

(54) ARRAY SUBSTRATE FOR A LIQUID CRYSTAL DISPLAY AND METHOD FOR FABRICATING THEREOF

(75) Inventor: Gee-Sung Chae, Inchon (KR)

(73) Assignee: LG. Philips LCD Co., Ltd., Seoul (KR)

(*) Notice: Subject to any disclaimer, the term of this patent is extended or adjusted under 35 U.S.C. 154(b) by 591 days.

(21) Appl. No.: 09/893,962

(22) Filed: Jun. 29, 2001

(65) Prior Publication Data
US 2002/0027621 A1 Mar. 7, 2002

(30) Foreign Application Priority Data
Sep. 4, 2000 (KR) .......................................... 2000-52147

(51) Int. Cl.$^7$ ........................................... G02F 1/1333
(52) U.S. Cl. ............................ 349/40; 349/54; 257/88
(58) Field of Search ............................. 257/81–82, 88; 349/40, 54

(56) References Cited

U.S. PATENT DOCUMENTS 6,128,051 A * 10/2000 Kim et al. ..................... 349/40
6,287,899 B1 * 9/2001 Park et al. ..................... 438/149

FOREIGN PATENT DOCUMENTS

| KR | 1998-0003745 | 3/1998 |
|---|---|---|
| KR | 1999-0088504 | 12/1999 |

* cited by examiner

Primary Examiner—Douglas Wille
Assistant Examiner—Ginette Peralta
(74) Attorney, Agent, or Firm—McKenna Long & Aldridge LLP

(57) ABSTRACT

An LCD fabricated by forming gate lines, gate electrodes, gate pads, vertical patterns, and a first gate shorting bar on a substrate, forming channels over the gate electrodes, forming data lines, source electrodes, drain electrodes, and a second shorting bar, forming a passivation layer, patterning the passivation layer to form drain contact holes to the drain electrodes, data pad contact holes to the data pads, first connecting contact holes to the first gate shorting bar, second connecting contact holes to the second gate shorting bar, and etching holes to the vertical patterns, forming a transparent conductive layer, and patterning the transparent conductive layer to form pixel electrodes, first pad connectors that connect odd numbered gate pads to the first gate shorting bar, and second pad connectors that connect the even numbered gate pads to the second gate shorting bar, wherein the vertical patterns are etched via the etching holes.

6 Claims, 8 Drawing Sheets

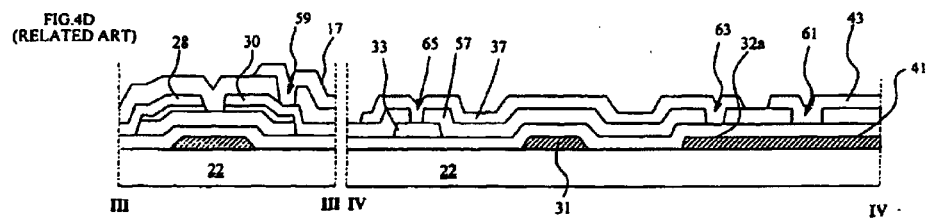
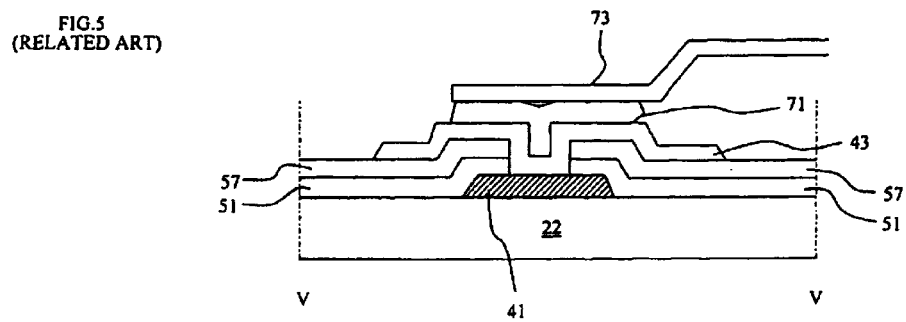
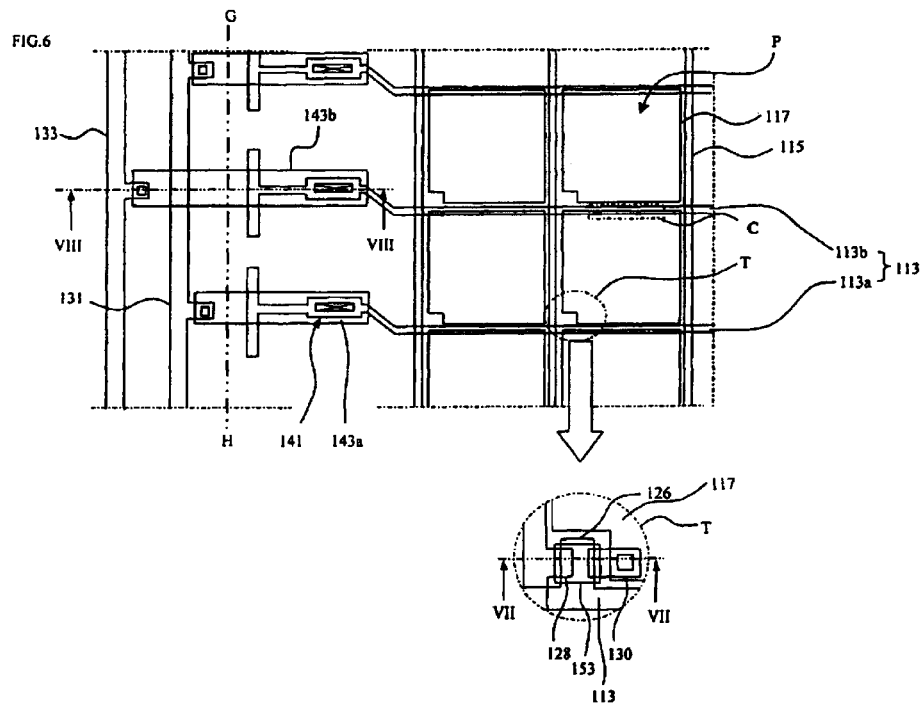

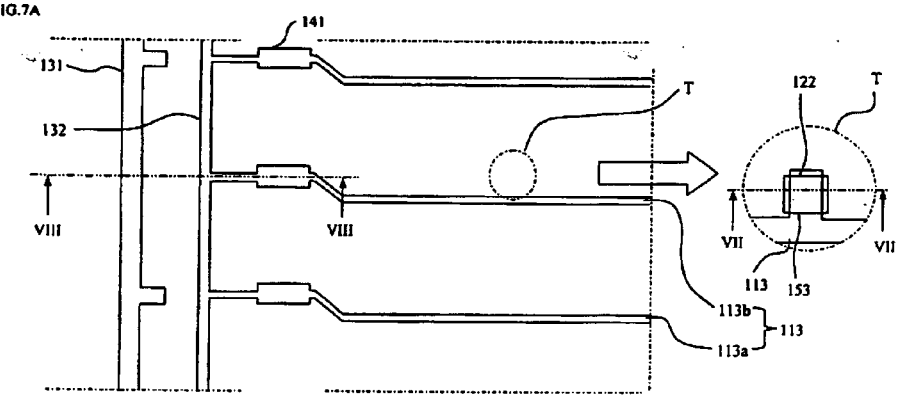
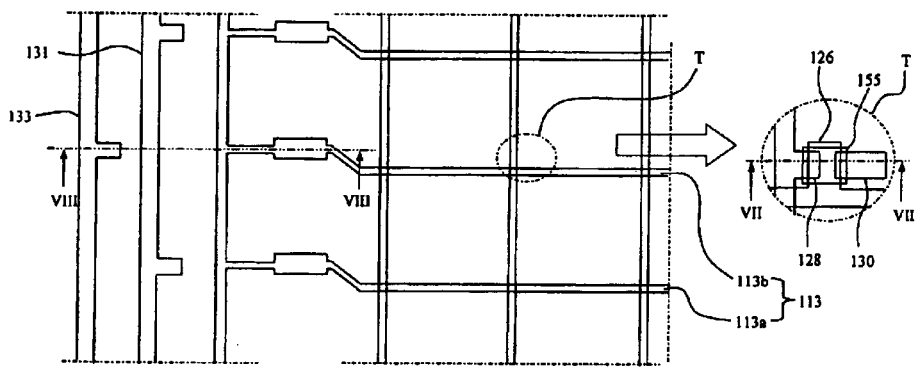
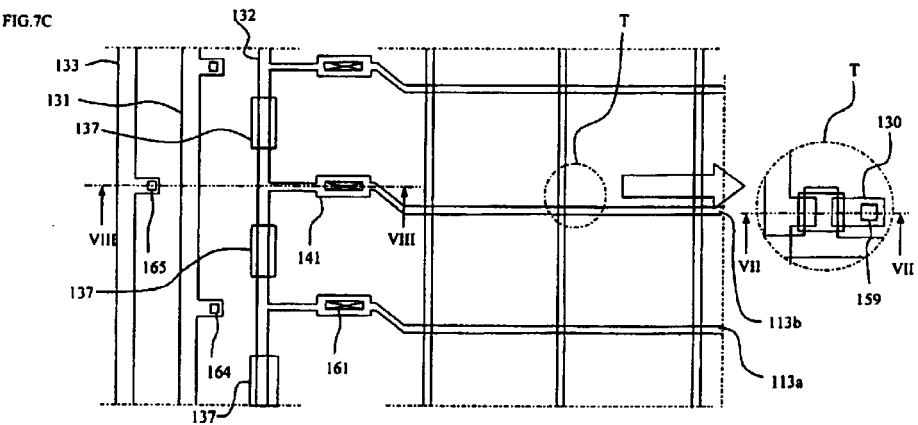

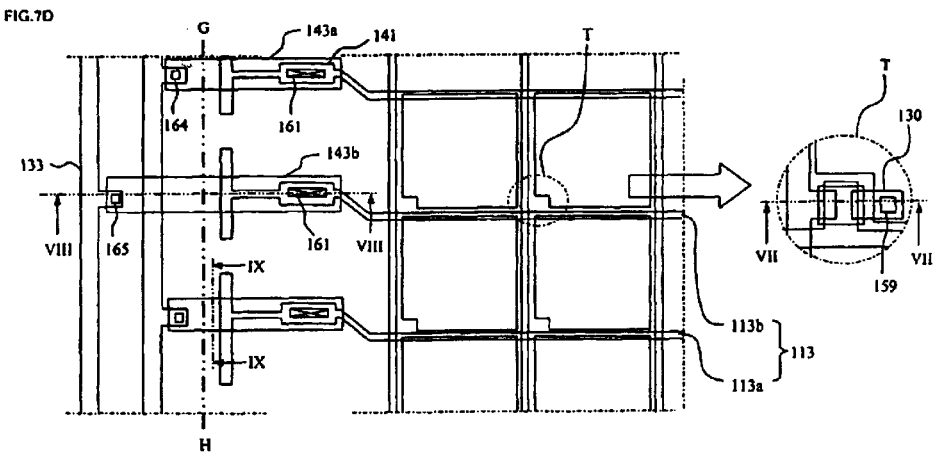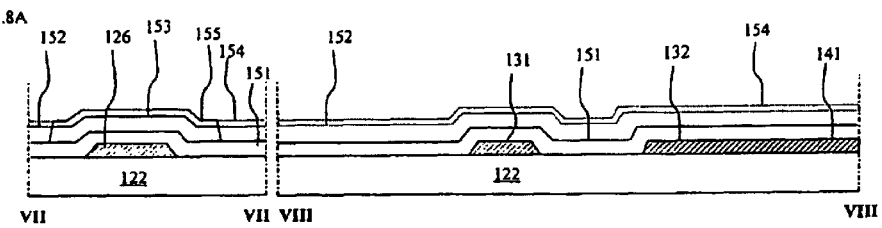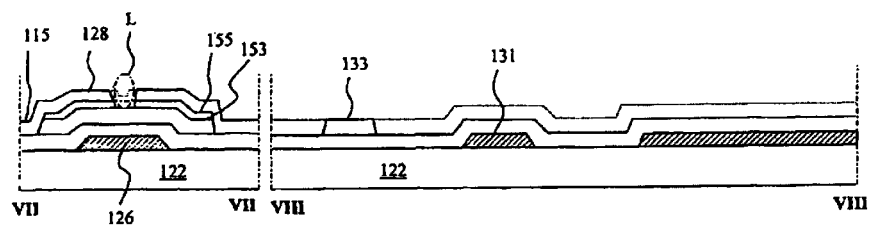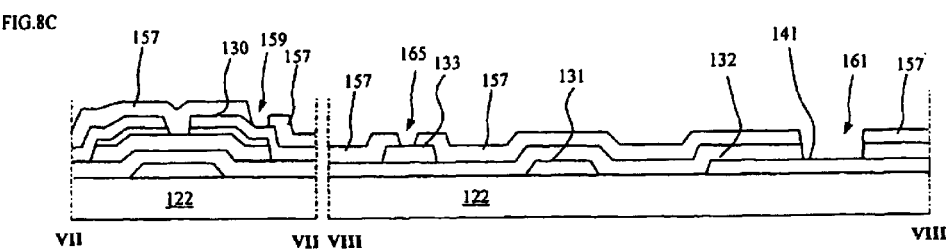

ARRAY SUBSTRATE FOR A LIQUID CRYSTAL DISPLAY AND METHOD FOR FABRICATING THEREOF

This application claims the benefit of Korean Patent Application No. 2000-52147, filed on Sep. 4, 2000 in Korea, which is hereby incorporated by reference for all purposes as if fully set forth herein.

BACKGROUND OF THE INVENTION

1. Field of the Invention

The present invention relates to a liquid crystal display device, and more particularly, to an array substrate of a liquid crystal display device that has a shorting bar used for testing.

2. Description of Related Art

In general, liquid crystal display (LCD) devices use the optical anisotropy and polarization properties of liquid crystal molecules. Because of their peculiar characteristics, liquid crystal molecules have a definite orientational arrangement that can be controlled by an applied electric field. In other words, when electric fields are applied to liquid crystal molecules, the arrangement of the liquid crystal molecules changes. Since incident light is refracted according to the arrangement of the liquid crystal molecules image data can be displayed.

Of the many different types of LCDs, an active matrix LCD (AM-LCD), having thin film transistors and pixel electrodes that are arranged in a matrix, is a major subject of research and development. This is at least partially due to the high resolution and superior ability of AM-LCDs to displaying moving image.

LCD devices are typically light, thin, and consume little power. LCDs have become widely used in office automation (OA) equipment and in video display units.

A typical liquid crystal display (LCD) panel has upper and lower substrates and an interposed liquid crystal layer. The upper substrate, often referred to as a color filter substrate, usually includes a common electrode, color filters, and a black matrix. The lower substrate, often referred to as an array substrate, includes switching elements, such as thin film transistors (TFTs), and pixel electrodes.

As previously indicated the operation of an LCD device is based on the principle that the alignment direction of liquid crystal molecules depends on an applied electric field, such as that produced by the common and pixel electrodes. A liquid crystal layer having a spontaneous polarization characteristic is an optical anisotropy material. Liquid crystal molecules have dipole moments based on the spontaneous polarization when a voltage is applied. Thus, the alignment direction of the liquid crystal molecules is controlled by applying an electric field to the liquid crystal molecules. When the alignment direction of the liquid crystal molecules is properly adjusted, the liquid crystal molecules are aligned, and light is refracted along the alignment direction to display image data. The liquid crystal molecules function as optical modulation elements having predetermined optical characteristics.

FIG. 1 shows the configuration of a typical LCD device. The LCD device 11 includes upper and lower substrates 5 and 22 and an interposed liquid crystal layer 14. The upper and lower substrates 5 and 22 are generally referred to as a color filter substrate and an array substrate, respectively.

On the upper substrate 5, on the surface opposing the lower substrate 22, are a black matrix 6 and a color filter layer 7. The color filter layer 7 includes a plurality of red (R), green (G), and blue (B) color filters formed in the shape of a matrix array. Each color filter is surrounded by the black matrix 6. Also on the upper substrate 5 is a common electrode 18 that covers the color filter layer 7 and the black matrix 6.

On the lower substrate 22, on the surface opposing the upper substrate 5, is a plurality of thin film transistors (TFTs) "T" that act as switching devices. The TFTs are formed in the shape of a matrix array that corresponds to that of the color filter layer 7. A plurality of crossing gate and data lines 13 and 15 are positioned such that each TFT "T" is located near a crossover point of the gate and data lines 13 and 15.

Further on the lower substrate 22 is a plurality of pixel electrodes 17. The pixel electrodes are formed in pixel regions "P" defined by the crossing gate and data lines 13 and 15. The pixel electrodes 17 are usually formed of a transparent conductive material having good transmissivity, such as indium-tin-oxide (ITO) or indium-zinc-oxide (IZO).

According to the above-described LCD device, scanning signals are applied to gate electrodes of the TFTs "T" through the gate lines 13, while data signals are applied to source electrodes of the TFTs "T" through the data lines 15. As a result, the liquid crystal molecules of the liquid crystal layer 14 are aligned and orientated by switching the TFTs "T." By properly switching the TFTs the light that passes through the liquid crystal layer 14 can be controlled so as to produce a desired image.

FIG. 2 is a plan view illustrating several pixels of an array substrate according to the conventional art. As shown, an array substrate includes a plurality of pixel regions "P," each of which has a thin film transistor (TFT) "T", a pixel electrode 17 and a storage capacitor "C". Gate lines 13 are arranged in a transverse direction and data lines 15 are arranged in a longitudinal direction such that pairs of gate and data lines 13 and 15 define the pixel regions "P." Each TFT "T" includes a gate electrode 26, a source electrode 28, a drain electrode 30 and an active layer (not shown). The gate electrodes 26 extend from the gate lines 13, while the data electrodes 28 extend from the data lines 15. Further, gate pads 41 are arranged respectively at one end of each gate line 13. The gate pads 41 electrically communicate with the gate lines 13. Data pads (not shown) are arranged respectively at one end of each data line 15 (and communicate with the data lines 15). A plurality of transparent pad electrodes is formed on the pads. The transparent pad electrodes receive external signals from driving circuitry (not show). A transparent pad electrode on a gate pad 41 is called a gate pad electrode 43, and a transparent pad electrode on a data pad (not shown) is called a data pad electrode (also not shown).

In general, the gate lines 13 are grouped into odd numbered gate lines 13a and even numbered gate lines 13b, and the data lines 15 are grouped into odd numbered data lines and even numbered gate lines. The gate pads 41 and the data pads (not show) are also correspondingly grouped into even numbered gate/data pads and odd numbered gate/data pads. Among the gate and data lines 13 and 15, the even numbered lines and the odd numbered lines are respectively connected to different shorting bars. The shorting bars prevent discharge of static electricity from occurring on the gate and data lines 13 and 15.

In other words, since transparent glass (an insulator) is conventionally used for the substrates of LCD devices, static electricity generated during the manufacturing processes must be dealt with. Although static electricity typically has only a small electric charge, it has a high voltage that can damage the TFT, the gate and data lines, and the other elements if discharged. To prevent such problems, the shorting bars connected to the gate and data lines 13 and 15 force equipotentials on the electrically connected elements. Namely, each shorting bar is electrically connected with the even/odd numbered gate or data pad. For convenience, the following explanation will focus on the gate shorting bars, but the data shorting bars are similar.

Arrays having the above-mentioned structure are tested for open and shorted gate (and data) lines using special test equipment, such as an In-Process Tester (IPT) from Photon Dynamics, Inc., Milpitas, Calif. That tester can use noncontact methods to find array defects. Further, while testing gate lines 13 for opens and shorts using the IPT, the gate lines 13 are grouped into the odd numbered gate lines 13a and the even numbered gate lines 13b. A voltage is applied to the odd and even numbered gate lines 13a and 13b.

Still referring to FIG. 2, a first gate shorting bar 31 is formed in the same plane using the same material as the gate lines 13 such that the first gate shorting bar 31 connects to the odd numbered gate lines 13a. A second gate shorting bar 33 is formed along with the data lines 15 in a later manufacturing step. The even numbered gate lines 13b do not contact the first gate shorting bar 31, but are connected with the second gate shorting bar 33 through transparent connectors 37. Namely, portions connecting the even numbered gate lines 13b to the first gate shorting bar 31 are eliminated during fabrication. Therefore, one end of the transparent connectors 37 contacts the end of these portions, while the other end of the transparent connectors 37 contacts the second gate shorting bar 33.

After completing the array substrate and after testing for opens and shorts, the first and second gate shorting bars 31 and 33 are cut away along lines A–B or E–F. However, during cutting, if the gate lines 13 and gate pads 41 are made of copper or of a copper alloy, the gate pads 41 tend to rise from the glass substrate. Namely, since copper and copper alloys do not have good adhesion to glass substrates the gate pads 41 are affected by the physical contact during cutting. Thus, portions of the gate pads 41 and gate lines 13 around the cut lift off of the glass substrate.

Various structures of the above-mentioned array substrate will be explained in more detail with reference to FIGS. 3A to 3D and 4A to 4D. FIGS. 3A to 3D are plan views that help explain the fabricating processes of the array substrate of FIG. 2. FIGS. 4A to 4D are cross-sectional views, taken along lines III—III and IV—IV, of FIGS. 3A to 3D that help explain conventional fabricating processes of an array substrate and a TFT "T."

Thin film transistors (TFTs) can be divided into two different categories based upon the relative disposition of their gate electrodes, staggered and coplanar. Staggered type TFTs include the inverted staggered type, which is generally used for LCD devices due to their simple structure and superior efficiency. Within the inverted staggered type TFT is a back channel etched type (EB) and an etch stopper type (ES). A manufacturing method of the back channel etched type TFT will be explained hereinafter.

Referring now to FIGS. 3A and 4A, a substrate 22 is first cleaned of organic materials and foreign substances to promote adhesion of a first metal layer that is subsequently deposited on the substrate 22 by sputtering. Then, the first metal layer, i.e., copper (Cu) or copper alloy (Cu-alloy), is patterned to form the gate lines 13, gate electrodes 26 that extend from each gate line, gate pads 41 at one end of the gate lines, and a first shorting bar 31 that is perpendicular to the gate lines 13 and that contact the gate pads 41 through connecting lines 32, 32a and 32b.

The gate lines 13 are grouped into odd numbered gate lines 13a and even numbered gate lines 13b. Each odd numbered gate line 13a, including its gate pad 41, electrically contacts the first shorting bar 31 via a direct connecting line 32, while each even numbered gate line 13b, including its gate pad 41, electrically contacts the first shorting bar 31 via a first connecting line 32a and a second connecting line 32b. The first connecting lines 32a protrude from the gate pads 41, and the second connecting lines 32b extend from the first shorting bar 32b and perpendicularly contact a first connecting line 32a.

Still referring to FIGS. 3A and 4A, a gate insulation layer 51 is formed on an entire surface of the substrate 22 and over the patterned first metal layer. Then, a pure amorphous silicon (a-Si:H) layer 52 and a doped amorphous silicon (n+a-Si:H) layer 54 are formed in sequence on the gate insulation layer 51. Thereafter, both the pure amorphous silicon layer 52 and the doped amorphous silicon layer 54 are patterned to respectively form an active layer 53 and an ohmic contact layer 55 on the gate insulation layer 51, particularly over the gate electrode 26.

Now, referring to FIGS. 3B and 4B, a second metal layer is deposited over the substrate. Then, the second metal layer is patterned to form data lines 15 that are perpendicularly to the gate lines 13, a source electrode 28 that extends from each data line, a drain electrode 30 that is spaced apart from each source electrode 28, and a second shorting bar 33 that is spaced apart from the first shorting bar 31 perpendicularly to the gate lines 13. As shown in FIG. 4B, a portion "K" of the ohmic contact layer 55 between the source and drain electrodes 28 and 30 is eliminated using the source and drain electrodes 28 and 30 as masking layers, thereby forming a channel region in the active layer 53 over the gate electrode 26.

Now, referring to FIGS. 3C and 4C, a passivation layer 57 is formed over the remaining portions of the patterned second metal layer such that the passivation layer 57 covers the data lines 15, the source and data electrodes 28 and 30, and the second gate shorting bar 33. Thereafter, the passivation layer 57 is patterned to form drain contact holes 59 to the drain electrodes 30, gate pad contact holes 61 to the gate pads 41, first connecting contact holes 63 to the first connecting line 32a, and second connecting contact holes 65 to the second shorting bar 33. Furthermore, etching holes 67, as shown in FIG. 3C, are formed over each second connecting line 32b when forming the above-mentioned contact holes.

Next, as shown in FIGS. 3D and 4D, a transparent conductive material, such as ITO or IZO, is deposited and patterned to form pixel electrodes 17, each of which contacts a drain electrode 30 through a drain contact hole 59 which is positioned in the pixel region "P" (see FIG. 2). Simultaneously, the gate pad electrodes 43, each of which has an island shape, are formed on the gate pads 41 along with the pixel electrodes 17. The transparent connectors 37 are formed over the first shorting bar 31. Each transparent connector 37 electrically connects each even numbered gate line 13b to the second shorting bar 33 through both the first connecting contact hole 63 and the second connecting contact hole 65.

While patterning the transparent conductive material, the second connecting lines 32b that are exposed by the etching holes 67 (see FIG. 3C) are etched such that the second connecting lines 32b are open-circuited from the first gate shorting bar 31. Accordingly, the even numbered gate lines 13b are not electrically connected with the first shorting bar 31.

In the aforementioned structure, the odd numbered gate lines 13a are connected with the first gate shorting bar 31 and the even numbered gate lines 13b are connected with the second gate shorting bar 33. The gate lines 13 are tested for shorts and opens using the IPT. After testing, the first and second shorting bars 31 and 33 are cut along the lines A–B or E–F. At this time, since the gate lines 13 and gate pads 41 are made of copper (Cu) or copper alloy (Cu-alloy) that does not have good adhesion to the glass substrate 22, the gate lines 13 and gate pads 41 tend to rise from the glass substrate. However, copper (Cu) and copper alloy (Cu-alloy) have good electrical characteristics. Thus, the gate lines 13 and gate pads 41 are affected by the cutting process such that the adhesion between the glass substrate 22 and the gate lines/pads is deteriorated.

FIG. 5 is a cross-sectional view taken along line V—V of FIG. 3D. As shown, a tape carrier package (TCP) 73 having a drive circuit is bonded to the gate pad electrode 43 using an anisotropic conductive film (ACF) 71. However, if the TCP 73 is misaligned with the gate pad electrode 43, or does not contact the gate pad electrode 43 during bonding, the TCP 73 is separated from the ACF 71. Re-work to align the TCP 73 with the gate pad electrode 43 is then required. During re-work, the gate pads 41 and gate lines 13 can be damaged due to the fact that they have low adhesion to the glass substrate 22 caused by the above-mentioned cutting process.

SUMMARY OF THE INVENTION

Accordingly, the present invention is directed to an array substrate for a liquid crystal display, and to a method for fabricating thereof, that substantially obviates one or more of problems due to limitations and disadvantages of the related art.

An object of the present invention is to provide an array substrate for a liquid crystal display device having a structure in which a cutting process does not cut gate pads, gate lines, or other connecting lines.

Additional features and advantages of the invention will be set forth in the description that follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate; a first gate shorting bar arranged in one direction along the periphery of the substrate, the first gate shorting bar having a plurality of first connecting contact holes; a second gate shorting bar spaced apart from and arranged parallel with the first gate shorting bar, the second gate shorting bar having a plurality of second connecting contact holes; a plurality of gate lines arranged perpendicular to the first and second gate shorting bars on the array substrate, the gate lines including odd numbered gate lines and even numbered gate lines; a plurality of gate pads formed at one end of the gate lines and connected thereto, the gate pads including odd numbered gate pads and even numbered gate pads, wherein each gate pad has an associated gate pad contact hole; a plurality of first pad connectors connecting the odd numbered gate pads to the first gate shorting bar through the gate pad contact holes and through the first connecting contact holes; a plurality of second pad connectors connecting the even numbered gate pads to the second gate shorting bar through the gate pad contact holes and through the second connecting contact holes; a plurality of data lines arranged perpendicular to the plurality of gate lines; a plurality of thin film transistors, each thin film transistor formed at a crossover of a gate line and a data line; and a plurality of pixel electrodes, each pixel electrode formed in a pixel region defined by the gate lines and the data lines.

The first gate shorting bar and the plurality of gate lines beneficially include copper (Cu).

Each thin film transistor includes a gate electrode, a source electrode and a drain electrode.

The first pad connectors, the second pad connectors, and the pixel electrodes are formed of a transparent conductive material, such as indium-tin-oxide (ITO) and indium-zinc-oxide (IZO).

In another aspect, a method of fabricating an array substrate for a liquid crystal display includes forming a first metal layer on a substrate; patterning the first metal layer to form gate lines, gate electrodes, gate pads, a vertical pattern, and a first gate shorting bar; forming a gate insulation layer on the array substrate to cover the patterned first metal layer; forming a pure amorphous silicon layer and a doped amorphous silicon layer on the gate insulation layer; forming an active layer and an ohmic contact layer over the gate electrodes; forming a second metal layer on the gate insulation layer to cover the active layer and the ohmic contact layer; patterning the second metal layer to form data lines, source electrodes, drain electrodes, and a second shorting bar; forming a passivation layer to cover the patterned second metal layer; patterning the passivation layer to form drain contact holes to the drain electrodes, data pad contact holes to the data pads, first connecting contact holes to the first gate shorting bar, second connecting contact holes to the second gate shorting bar, and etching holes to the vertical pattern; forming a transparent conductive layer over the patterned passivation layer; and patterning the transparent conductive layer to form pixel electrodes, a first pad connector, and a second pad connector, wherein the etching holes enable the cutting of an electrical connection between the gate lines during patterning the transparent conductive layer.

The gate electrodes extend from the gate lines, the gate pads are arranged at one end of the gate lines, and the first gate shorting bar is spaced apart from and arranged parallel with the vertical patterns.

The source electrodes extend from the data lines, and the drain electrodes are spaced apart from the source electrodes.

The gate lines, the gate electrodes, the gate pads, the vertical pattern and the first gate shorting bar beneficially include copper (Cu).

The transparent conductive layer is made of a material selected from a group consisting of indium-tin-oxide (ITO) and indium-zinc-oxide (IZO).

The pixel electrodes are connected with the drain electrodes through the drain contact holes and are located in pixel regions defined by the gate lines and the data lines.

The first pad connector electrically connects an odd numbered gate line to the first gate shorting bar, and the second pad connector electrically connects an even numbered gate line to the second gate shorting bar.

The first pad connector and the second pad connector contact a gate pad through a gate pad contact hole.

The first pad connector contacts the first gate shorting bar through a first connecting contact hole, while the second pad connector contacts the second shorting bar through a second connecting contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate an embodiment of the invention and together with the description serve to explain the principle of the invention.

In the drawings:

FIGS. 4A to 4D are cross-sectional views taken along lines III—III and IV—IV of FIGS. 2 and 3A to 3D and illustrate conventional fabricating processes of an array substrate and a TFT "T".

FIG. 5 is a cross-sectional view taken along line V—V of FIG. 3D;

FIG. 6 is a plan view illustrating several pixels of an array substrate of a liquid crystal display device according to the present invention;

FIGS. 7A to 7D illustrate fabricating processes for the array substrate of FIG. 6;

FIGS. 8A to 8D are cross-sectional views taken along lines VII—VII and VIII—VIII of FIGS. 6 and 7A to 7D and illustrate inventive fabricating processes for an array substrate and a TFT "T"

DETAILED DESCRIPTION OF ILLUSTRATED EMBODIMENTS

Figure 1:
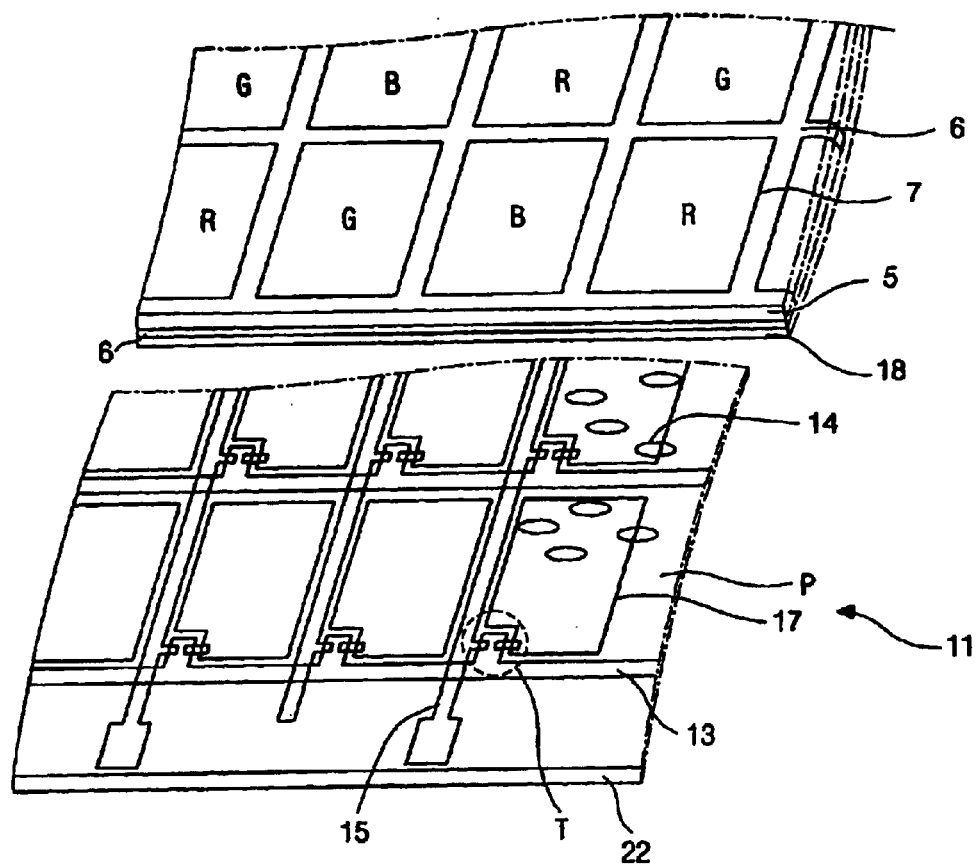
FIG. 1 illustrates the configuration of a typical LCD device.
Figure 2:
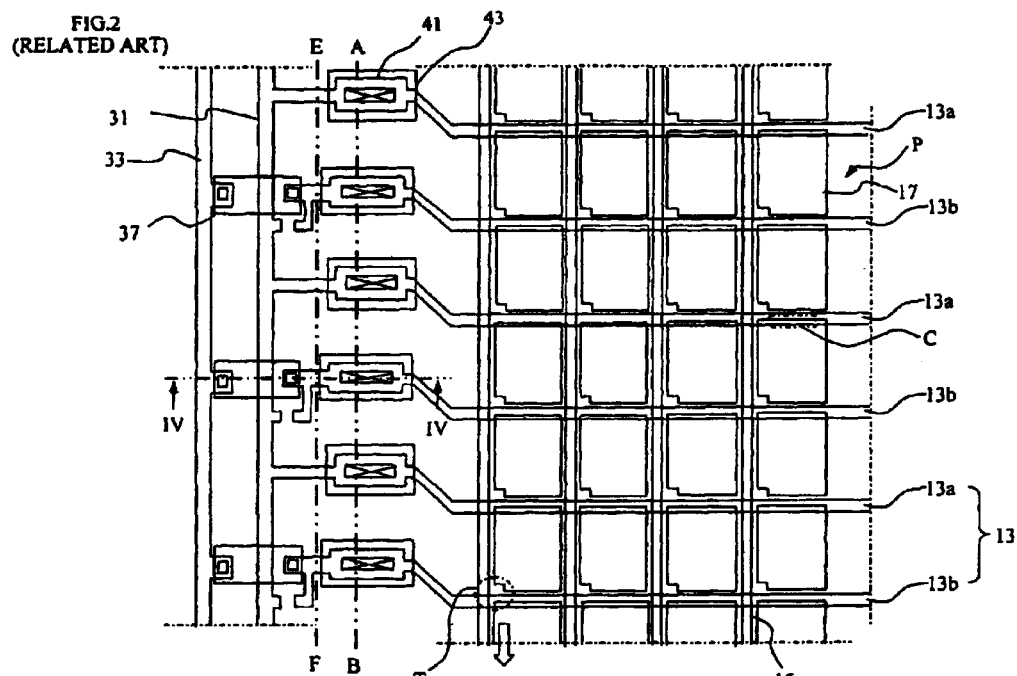
FIG. 2 is a plan view illustrating several pixels of an array substrate according to the conventional art.
Figure 3A:
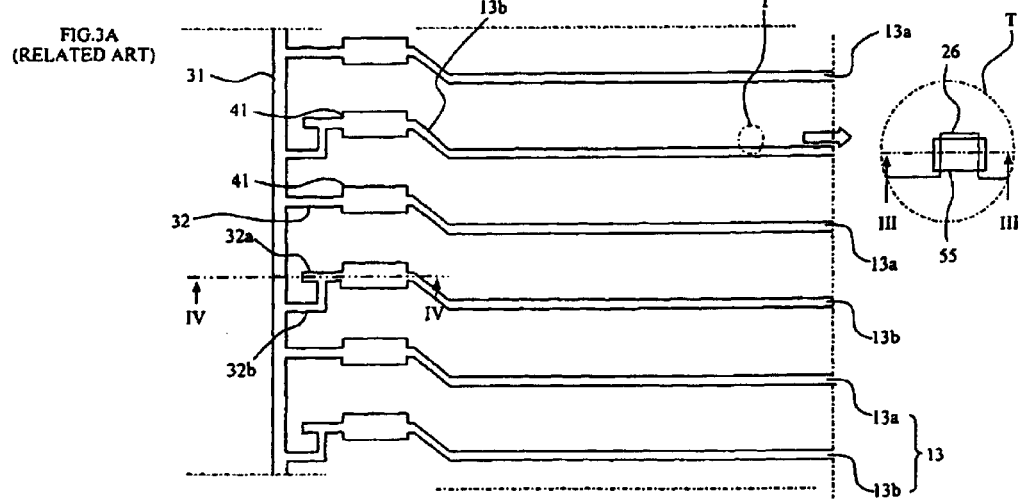
FIGS. 3A to 3D illustrate fabricating processes for the array substrate of FIG. 2.
Figure 3B:
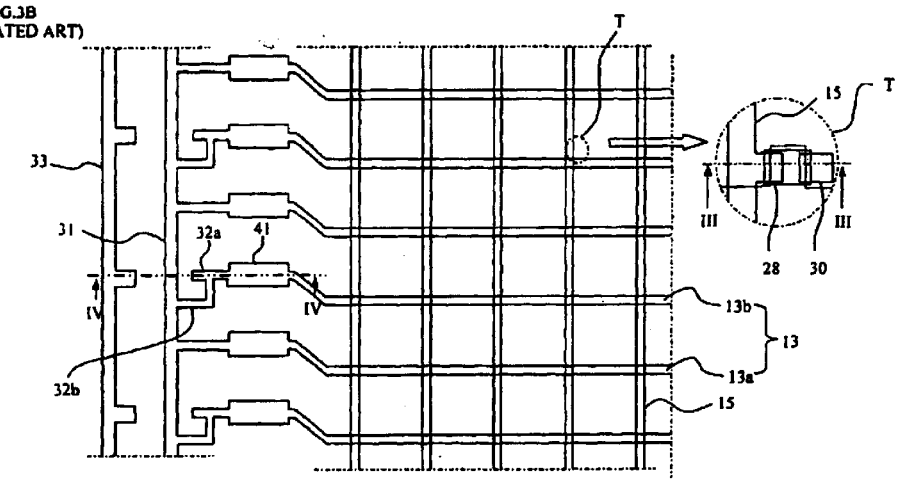
Figure 3C:
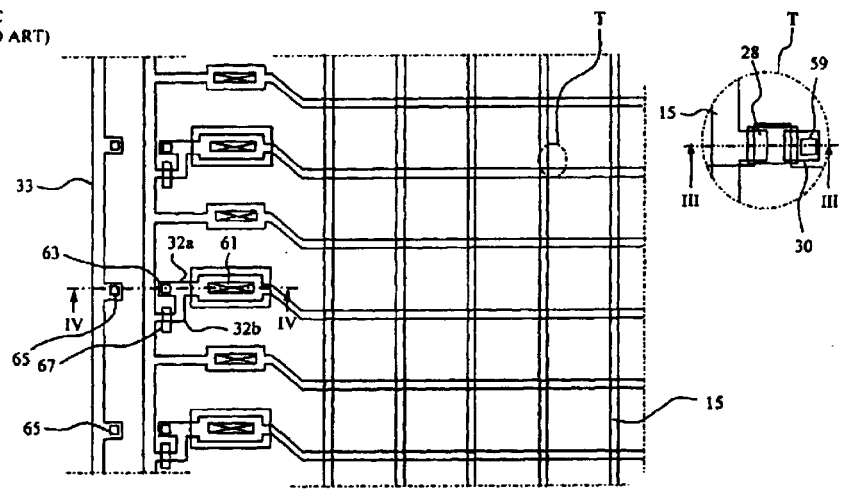
Figure 3D:
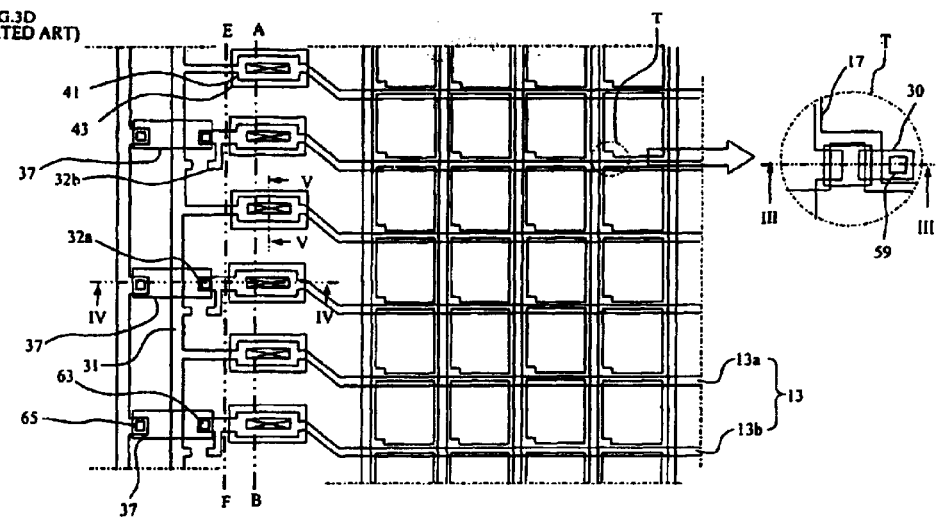
Figure 4A:
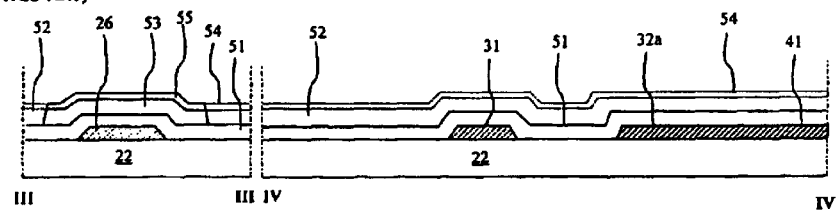
Figure 4B:
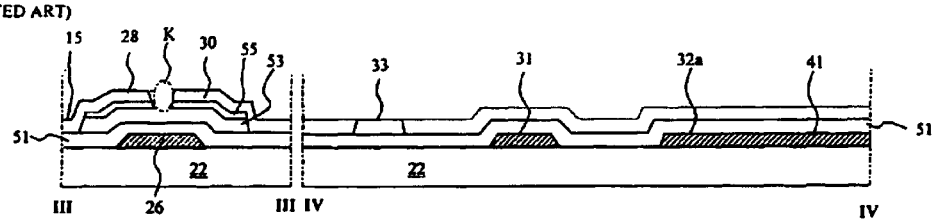
Figure 4C:
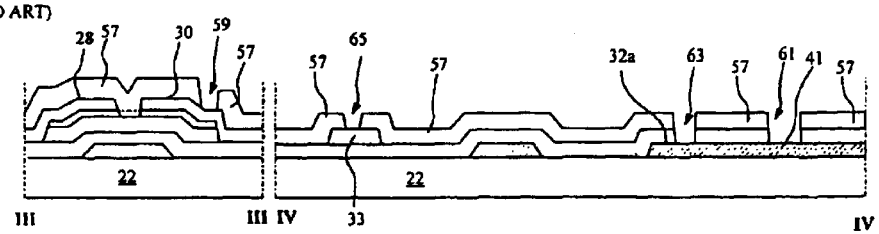

Reference will now be made in detail to illustrated embodiment of the present invention, examples of which is shown in the accompanying drawings. Wherever possible, the same reference numbers will be used throughout the drawings to refer to the same or like parts.

FIG. 6 is a plan view illustrating several pixels of an array substrate of a liquid crystal display device according to the present invention. As shown, an array substrate includes a plurality of pixel regions "P," each of which has a thin film transistor (TFT) "T," a pixel electrode 117 and a storage capacitor "C." Gate lines 113 are arranged in a transverse direction and data lines 115 are arranged in a longitudinal direction such that pairs of the gate lines 113 and data lines 115 define the pixel regions "P." As shown in an enlarged view of a TFT "T," each TFT "T" includes a gate electrode 126, a source electrode 128, a drain electrode 130 and an active layer 153. The gate electrodes 126 extend from the gate lines 113, while the data electrodes 128 extend from the data lines 115. Further, gate pads 141 are arranged at ends of the gate lines 113 and communicate with the gate lines 113.

Data pads (not shown) are arranged respectively at ends of the data lines 115 and communicate with the data lines 115.

The gate lines 113 are grouped into odd numbered gate lines 113a and even numbered gate lines 113b, and the data lines 115 are grouped into odd numbered data lines and even numbered data lines. The gate pads 141 and the data pads (not show) are also correspondingly grouped into even numbered gate/data pads and odd numbered gate/data pads. Among the gate and data lines 113 and 115, the even numbered lines and the odd numbered lines are respectively connected to different shorting bars in order to prevent the discharge of static electricity from occurring in the gate and data lines 113 and 115. As previously described, because transparent glass substrates are conventionally used for the substrates of LCD devices, static electricity generated during manufacturing processes will flow into the array patterns. Accordingly, the TFT, the gate lines and the data lines are all susceptible to significant damage by discharge of the static electricity. To prevent such damage, shorting bars are connected with the gate lines and the data lines. Namely, each shorting bar is electrically connected with the even/odd numbered gate or data pad. For convenience, the following explanation focuses on the gate shorting bars. The data shorting bars are similar.

Still, referring to FIG. 6, a first shorting bar 131 is arranged in parallel with the data lines 115 along the periphery of the array substrate, and a second shorting bar 133 is arranged parallel with and spaced apart from the first shorting bar 131. In the inventive array substrate shown in FIG. 6, the odd numbered gate lines 113a are electrically connected to the first shorting bar 131 through first transparent pad connectors 143a, while the even numbered gate lines 113b are electrically connected to the second shorting bar 133 through second transparent pad connectors 143b.

As mentioned, array substrates are tested for opens and shorts using specialized test equipment, such as the In-Process Tester (IPT) from Photon Dynamics, Inc., Milpitas, Calif., which can use non-contact methods to find array defects. Further, while testing the gate lines 113 for opens and shorts using the IPT, the odd numbered gate lines 113a and the even numbered gate lines 113b receive voltages.

After testing the array substrate for opens and shorts, the first and second gate shorting bars 131 and 133 are cut from the array substrate along line G-H. When cutting, the gate lines 113 and gate pads 141 are not under the cutting line G-H. Therefore, the gate lines 113 and gate pads 141 do not rise from the array substrate since the cutting process does not affect the gate lines 113 and gate pads 141. This is in contrast to the conventional art.

The structure of the above-mentioned inventive array substrate will be explained in more detail with reference to FIGS. 7A to 7D and 8A to 8D. FIGS. 7A to 7D are plan views illustrating fabricating processes of the arrays substrate of FIG. 6. FIGS. 8A to 8D are cross-sectional views of FIGS. 7A to 7D taken along lines VII—VII and VIII—VIII, and illustrate inventive fabricating processes of an array substrate and a TFT "T."

Referring now to FIGS. 7A and 8A, a substrate 122 is first cleaned of organic materials and foreign substances to promote adhesion with a first metal layer that is subsequently deposited on the substrate 122. Then, the first metal layer, i.e., copper (Cu) or copper alloy (Cu-alloy), is deposited and patterned to form the gate lines 113 in a transverse direction, gate electrodes 126 that extend from gate lines, gate pads 141 that are disposed at one end of the gate lines 113, and a first shorting bar 131 that is perpendicular to the gate lines 113. Simultaneously, a vertical pattern 132 is formed perpendicularly to the gate lines 113. The vertical pattern 132 contacts every gate pads 141 such that the gate lines 113 have equipotentials. Therefore, the gate lines 113 are protected from the static electricity that is generated during the manufacturing processes. Accordingly, as shown in FIG. 7A, the vertical pattern 132 acts as an equipotential line, and it is in one united body with the gate lines 113 and gate pads 141. Also, the first gate shorting bar 131 is spaced apart from the vertical pattern 132.

Still referring to FIGS. 7A and 8A, a gate insulation layer 151 is formed over an entire surface of the substrate 122, including over the patterned first metal layer. The gate insulation layer 151 includes an inorganic material, such as silicon nitride (SiNx) or silicon oxide (SiOx), or an organic material, such as BCB (Benzocyclobutene) or an acrylbased resin. Then, a pure amorphous silicon (a-Si:H) layer 152 and a doped amorphous silicon (n+a-Si:H) layer 154 are formed in sequence on the gate insulation layer 151. Thereafter, both the pure amorphous silicon layer 152 and the doped amorphous silicon layer 154 are patterned to form an active layer 153 and an ohmic contact layer 155 over each gate electrode 126.

Now, referring to FIGS. 7B and 8B, a second metal layer is then deposited over the substrate 122. The second metal layer is formed of a material selected from a group consisting of tungsten (W), molybdenum (Mo), chrome (Cr) and the like. Then, the second metal layer is patterned to form data lines 115 that are perpendicular to the gate lines 113, source electrodes 128 that extend from the data lines, drain electrodes 130 that are spaced apart from the source electrodes 128, and a second shorting bar 133 that is spaced apart from the first shorting bar 131 and perpendicular to the gate lines 113. As shown in FIG. 8B, portion "L" of the ohmic contact layer 155 between the source and drain electrodes 128 and 130 are eliminated using the source and drain electrodes 128 and 130 as masking layers, thereby forming channel regions in the active layers 153.

Now, referring to FIGS. 7C and 8C, a passivation layer 157 is formed over the patterned second metal layer such that the passivation layer 157 covers the data lines 115, the source and drain electrodes 128, and the second gate shorting bar 133. Thereafter, the passivation layer 157 is patterned to form drain contact holes 159 to the drain electrodes 130, gate pad contact holes 161 to the gate pads 141, first connecting contact holes 164 to the first shorting bar 131, and second connecting contact holes 165 to the second shorting bar 133. Furthermore, a plurality of etching holes 137 are formed over portions of the vertical pattern 132, beneficially when forming the above-mentioned contact holes. Each etching hole 137 is positioned between an odd numbered gate line 113a and an even numbered gate line 113b. Thus, by removing the etching holes 137 will open the electrical connection between the odd numbered gate lines 113a and the even numbered gate lines 113b in a later step.

Figure 8D:
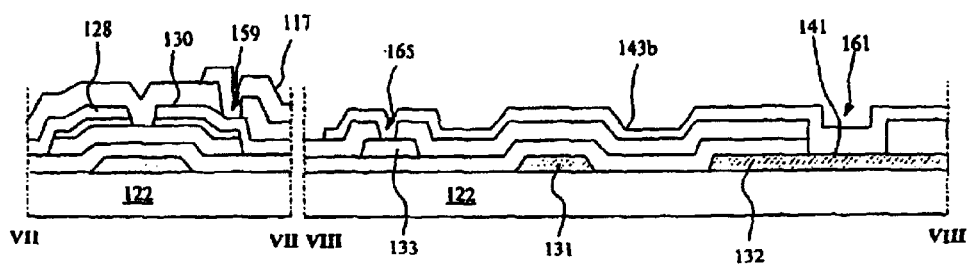

Next, as shown in FIGS. 7D and 8D, a transparent conductive material, such as ITO or IZO, is deposited and patterned to form pixel electrodes 117, each of which contacts a drain electrode 130 through a drain contact hole 159, and each of which is positioned in the pixel region "P" (see FIG. 6). Simultaneously, a first transparent pad connectors 143a and a second transparent pad connectors 143b are formed. The first transparent pad connectors 143a connect the odd numbered gate lines 113a to the first gate shorting bar 131 via gate contact holes 161 and first connecting contact holes 164, while the second transparent pad connectors 143b connect the even numbered gate lines 113b to the second gate shorting bar 133 via gate contact holes 161 and second connecting contact holes 165.

Furthermore, while patterning the transparent conductive material, the vertical patterns 132 exposed through the etching holes 137 (see FIG. 7C) are etched. Accordingly, the odd numbered gate lines 113a are electrically separated from the even numbered gate lines 113b.

The inventive array substrate having the above-mentioned structure is then tested to find opens and shorts in the gate lines using the IPT. Further, in the above-mentioned structure, while testing the gate lines 113 for opens and shorts, the odd numbered gate lines 113a and the even numbered gate lines 113b receive voltages. After the test, the first and second shorting bars 131 and 133 are cut away from the array substrate 122 along line G-H. At this time, as shown in FIG. 7D, neither the gate lines 113 nor the gate pads 141 are impacted by cutting along the line G-H. Namely, when cutting along line G-H what is cut are the transparent pad connectors and insulators. Thus, the gate pads 141 and the gate lines 113 are not deteriorated by the cutting. This is in contrast to the conventional art.

Figure 9:
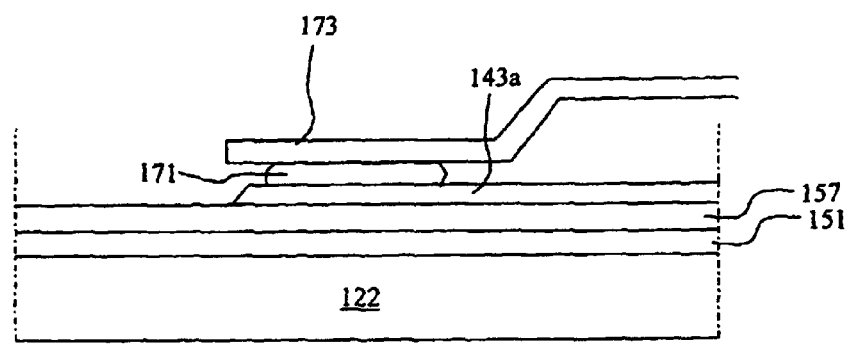
FIG. 9 is a cross-sectional view taken along line IX—IX of FIG. 7D.

FIG. 9 is a cross-sectional view taken along line IX—IX of FIG. 7D. As shown, a tape carrier package (TCP) 173 (having drive circuitry) is bonded to the first transparent pad connector 143a using an anisotropic conductive film (ACF) 171. The gate line 113, the gate pad 141, and the vertical pattern 132 (see FIGS. 7C and 7D) are not shown in FIG. 9. Therefore, although a TCP 173 might be separated from the ACF 171 and might have to be re-worked, re-work is performed under the conditions where the gate pads 141 and the gate lines 113 have not lifted from the substrate 122 due to cutting. This increases manufacturing yields of the LCD device.

It will be apparent to those skilled in the art that various modifications and variations can be made to the present invention without departing from the spirit or scope of the inventions. Thus, it is intended that the present invention covers the modifications and variations of this invention provided they come within the scope of the appended claims and their equivalents.

What is claimed is:

1. An array substrate, comprising:

a substrate;

a first gate shorting bar on the substrate, the first gate shorting bar having a plurality of first connecting contact holes;

a second gate shorting bar spaced apart from and parallel to the first gate shorting bar, the second gate shorting bar having a plurality second connecting contact holes;

a plurality of gate lines on the substrate and perpendicular to the first and second gate shorting bars, the gate lines comprising odd numbered gate lines and even numbered gate lines;

a plurality of gate pads comprising odd numbered gate pads connected to the ends of odd numbered gate lines and even numbered gate pads connected to the ends of even numbered gate lines, wherein each gate pad of said plurality of gate pads has a corresponding gate pad contact hole;

a plurality of first pad connectors, each connecting an odd numbered gate pad to the first gate shorting bar via the corresponding gate pad contact hole and via a corresponding first connecting contact hole; and a plurality of second pad connectors, each connecting an even numbered gate pad to the second gate shorting bar through the corresponding gate pad contact hole and via a corresponding second connecting contact hole.

2. The array substrate according to claim 1, wherein the plurality of gate lines include copper (Cu).

3. The array substrate according to claim 1, further including:
   a plurality of data lines that cross the plurality of gate lines so as to define a plurality of pixel regions;
   a plurality of thin film transistors, each thin film transistor having an associated pixel region; and
   a plurality of pixel electrodes, wherein each pixel electrode is located within an associated pixel region.

4. The array substrate according to claim 3, wherein each thin film transistor includes a gate electrode, a source electrode and a drain electrode.

5. The array substrate according to claim 3, wherein the first pad connectors, the second pad connectors, and the plurality of pixel electrodes are formed of a transparent conductive material.

6. The array substrate according to claim 5, wherein the transparent conductive material includes at least one material from a group consisting of indium-tin-oxide (ITO) and indium-zinc-oxide (IZO).

* * * * *